July 18, 1950     K. H. HACHMUTH     2,515,217
SOLVENT EXTRACTION PROCESS

Filed Jan. 2, 1948     2 Sheets-Sheet 1

INVENTOR.
K. H. HACHMUTH
BY Hudson & Young
ATTORNEYS

Patented July 18, 1950

2,515,217

UNITED STATES PATENT OFFICE 2,515,217

SOLVENT EXTRACTION PROCESS

Karl H. Hachmuth, Bartlesville, Okla., assignor to Phillips Petroleum Company, a corporation of Delaware Application January 2, 1948, Serial No. 130

7 Claims. (Cl. 260—677)

This invention relates to the solvent extractive separation of close boiling compounds. In one of its more specific aspects it relates to liquid-liquid extraction for the separation of close boiling compounds at atmospheric temperatures.

The general problem with which the present invention is concerned is the separation of compounds whose normal volatilities are such that the separation cannot be accomplished easily by ordinary distillation methods. The problem is especially serious in the case of separation of olefins from paraffins and diolefins from olefins, particularly butylenes from normal butane and 1,3-butadiene from normal butylene. The problem of such separation arises in the manufacture of butadiene from normal butane by 2-stage catalytic dehydrogenation, the normal butane being converted to normal butylenes in the first stage and the normal butylenes being converted to butadiene in the second stage.

At present these separations are accomplished either by extractive distillation processes which alter the relative volatilities of the compounds or by processes such as the copper-ammonium acetate process wherein one of the compounds enters into loose chemical combination with the solution and is thus removed from the stream being processed. The heat requirements of extractive distillation processes are unduly large compared with the heat theoretically necessary to make the separations. Solvents for use at the high temperatures necessary in extractive distillation processes are always expensive, and in many cases are unstable and deteriorate at process temperatures. Furfural is a typical example. In addition, at these high temperatures there are many corrosion difficulties.

The presence of excessive quantities of acetylene and ammonia in the finished product constitutes two major disadvantages of the copper-ammonium acetate process. Acetylene in the finished butadiene results in inferior rubber. Ammonia in the butadiene seriously retards subsequent polymerization processes.

When liquid-liquid extraction methods are used, the separations can be accomplished with a fraction of the energy requirements of the extractive distillation processes. The disadvantages of solvent deterioration and corrosion at high temperatures are also overcome. In addition, the finished product does not contain the excessive quantities of ammonia which are present when the copper-ammonium acetate process is used.

I have discovered a method for separating such close boiling compounds by liquid-liquid extraction under atmospheric temperature conditions. An object of my invention is to provide an improved solvent extraction method. Another object of my invention is to provide a method for the separation of close boiling chemical compounds. Still another object of my invention is to provide a method for the separation of close boiling compounds which requires the expenditure of minimum amounts of energy. Still another object is to provide a solvent extraction process for separating close boiling compounds under atmospheric temperature conditions. Still other objects and advantages will be apparent upon reading the following description and when taken in conjunction with the drawing respectively describes and illustrates a preferred method of operation.

Figure 1:
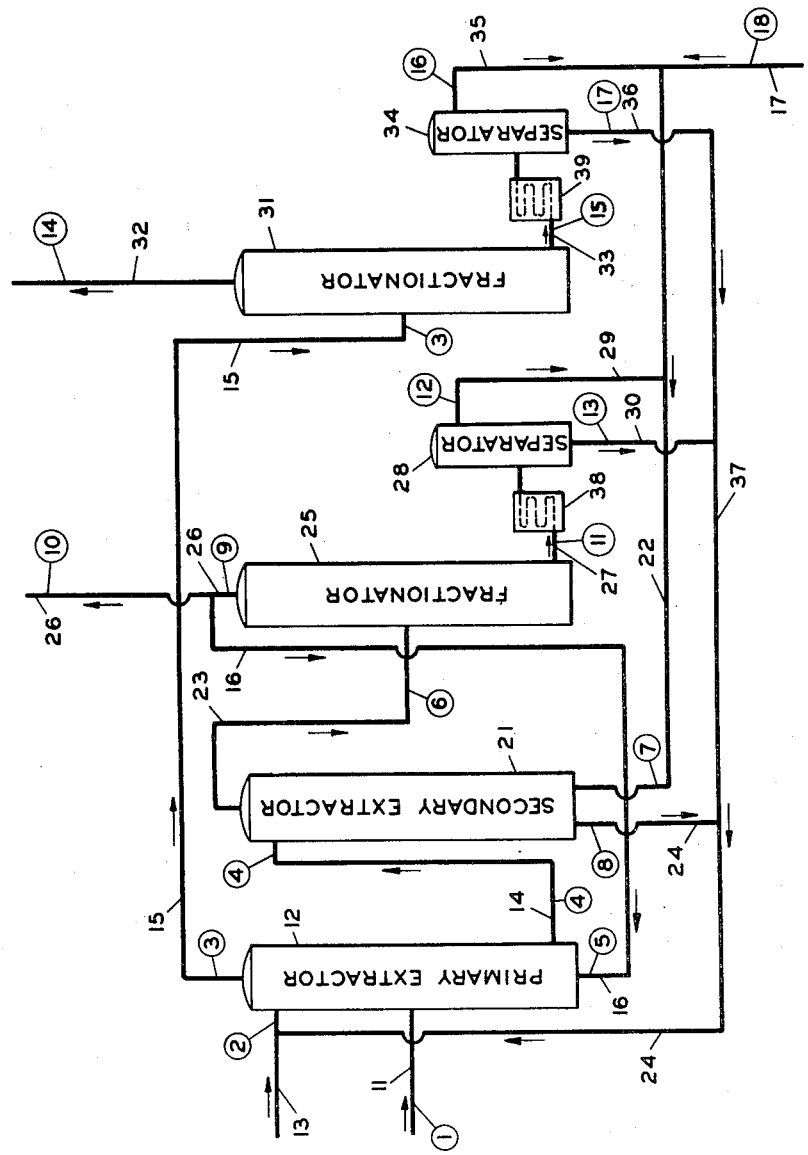
Figure 1 illustrates a flow diagram for the extractive separation of two close boiling components.

Referring now to Figure 1, reference numerals 12 and 21 refer to vessels or towers adapted for carrying out liquid-liquid extraction operations. Vessels 25 and 31 are fractionator towers of conventional design for the separation of a separated compound from a solvent by distillation. The vessel 12 herein termed the primary extraction tower is equipped with pipes 11, 13, 14, 15 and 16 through which materials pass into or out of the tower 12. Pipes 14, 22, 23 and 24 are attached to the secondary extraction tower 21 and serve to conduct materials to or from this tower. Lines 23, 26 and 27 are adapted to convey materials into or from the fractionator vessel 25. Lines 15, 32 and 33 are likewise adapted to conduct materials to or from the fractionator vessel 31. Pipe 27 is connected to a cooler 38 and pipe 33 is likewise connected to a cooler 39. Vessels 28 and 34 are merely accumulator or separator tanks for permitting stocks to separate into two liquid phases. Pipes 29 and 35 are connected to the upper portions of tanks 28 and 34 respectively, and are intended to permit removal of the light liquid phase which forms in these separators. Pipes 30 and 36 are connected to the bottom portions of the separator tanks 28 and 34 respectively, and are adapted to remove the heavier of the two liquid phases. Pipes 29 and 35 are manifolded into the pipe 22 while pipes 30 and 36 are manifolded into pipe 37 which in turn is connected with pipe 24 as shown in the drawing.

The extraction towers 12 and 21 may be of any desired internal construction provided of course, they are adapted to promote intimate contacting between the several liquid phases flowing countercurrently or otherwise through these vessels. In a similar manner the fractionator towers 25 and 31 may be of any particular design such as bubble cap or perforated trays or packed columns, provided they are adapted to carry out at least a reasonably efficient fractionation.

In the operation of my process as practiced according to the method of the flow diagram shown in Figure 1, a feed stock enters the extractor tower 12 at about a mid point through feed pipe 11. A two component stock for separation into the two components may be such a stock as a mixture of one or more of the isomeric heptanes and cyclo-hexane. The separation of some of the isomeric heptanes from one another or from cyclohexane is a very tedious and difficult problem if not almost impossible by fractionation methods since their boiling points are very close together. I will explain the operation of the process illustrated in Figure 1 for the separation of cyclohexane from one or more of the isomeric heptanes, the cyclohexane being removed as one product of the process while the one or more isomeric heptanes will be produced as the second product of the process.

As mentioned, this mixed feed stock may be passed into the extraction tower 12 through pipe 11 at about a mid point. A first solvent enters the extraction tower at the top through pipe 13. As an example of a satisfactory primary solvent, I will describe the use of furfural. Furfural has a specific gravity greater than 1 while the hydrocarbons being separated all have specific gravities of less than 1. Consequently the hydrocarbon feed stock entering through pipe 11 tends to rise in the extractor 12 in countercurrent relation to the downflowing relatively heavy furfural. Furfural selectively dissolves or extracts the cyclohexane from this hydrocarbon mixture and a cyclohexane rich extract leaves the tower 12 through the outlet pipe 14. The remaining or raffinate phase leaves the top of the vessel through the overhead pipe 15 and is transmitted to the fractionator 31. Some cyclohexane as subsequently separated may be added to the bottom of this extractor through pipe 16 and this added cyclohexane serves to reflux the extract material leaving through pipe 14. This refluxing assists in removal of any isomeric heptanes which might tend to be carried out in the extraction. The cyclohexane so added, of course, dissolves in the extract phase and by this solution in the extract phase tends to displace any of the isomeric heptanes and to liberate them as a lighter phase which will then rise up the tower under the influence of gravity and join the main portion of raffinate in the top of the extractor since as mentioned before these isomeric heptanes are lighter than the downflowing furfural.

The raffinate phase leaving the vessel 12 through the overhead line 15 passes to the fractionator 31 from which the isomeric heptanes leave as the overhead product through the overhead pipe 32 while any solvent carried in solution in the raffinate phase accumulates in the bottom and is removed through the bottoms draw 33. Bottoms product passing through the bottom drawer line 33, is cooled in cooler 39 and passes to a run storage tank 34 in which separation into two liquid phases may occur.

Some of a secondary solvent, the use of which is explained subsequently, finds its way into the primary solvent or furfural and both these solvents accumulate as bottoms in the fractionator 31. It is these two solvents then which separate into the two liquid phases in the accumulator or separator vessel 34. The heavier liquid or furfural leaves the bottom of the separator 34 through the pipe 36 and flows through pipes 37 and 24 into pipe 13 and from pipe 13 the furfural enters the primary extractor to complete this portion of the furfural cycle.

The extract phase leaving the extractor 12 through pipe 14 contains, of course, mainly furfural and cyclohexane and this mixture is passed into the top of vessel 21 which is a secondary extractor vessel. A secondary solvent from pipe 22 enters the bottom of the secondary extractor and rises therein in countercurrent relation to the downflowing heavy furfural containing phase.

This secondary solvent may, in general, be any hydrocarbon or narrow boiling range hydrocarbon fraction provided its boiling range is sufficiently far removed from that of the materials being separated to enable these materials and the secondary solvent to be separated easily by fractional distillation. In the particular case being described, the secondary solvent is preferably a paraffinic hydrocarbon such as n-octane.

In the secondary extraction tower 21 the normal octane extracts the cyclohexane from the furfural to form a second extract phase and this second extract phase then leaves vessel 21 through the overhead pipe 23 and is conducted to a distillation vessel 25 for further treatment. The furfural accumulates then in the bottom of the secondary extractor as a second raffinate phase since it remains as a treated or extracted phase. It however contains a small quantity of the secondary solvent since many liquids are at least somewhat soluble in other liquids. This second raffinate phase then leaves the extractor 21 through the pipe 24 and it is recycled then through pipe 13 as the main quantity of primary solvent into the primary extractor 12.

The secondary solvent which dissolves in the primary solvent in the secondary extractor 21 accounts for the presence of some secondary solvent in the primary extractor 12. Most of this secondary solvent entering the primary extractor leaves the primary extractor in the raffinate phase through the overhead pipe 15. The raffinate then from pipe 15, as mentioned hereinbefore, is fractionated in a fractionator 31 and the secondary solvent which accumulates in the bottoms of this fractionator separates then as a lighter liquid phase in the separator 34. This lighter phase is then removed and leaves through line 35 and is added to the main quantity of secondary solvent in line 22 for passage as the secondary solvent into the secondary extractor 21.

The secondary extract phase which leaves the top of the extractor 21 through the overhead line 23 is rich in cyclohexane and secondary solvent and contains only a minor proportion of the furfural. This extract phase then passes on through the pipe 23 into about mid point of the distillation tower 25. In this tower the cyclohexane is removed from the top as overhead product through pipe 26, a portion being withdrawn through line 16 to be added to the base of the primary extractor as the reflux material previously mentioned. The remainder of the cyclohexane passes on through the line 26 as a second product of the process and for such disposal as desired. The bottoms in the fractionator 25 consists mainly of the secondary solvent, which in this case is normal octane, and a small proportion of furfural. These bottoms leave the fractionator through pipe 27, are cooled in the cooler 38 and pass to the accumulator or separator vessel 28 in which the normal octane and the furfural separate as two liquid phases. The normal octane, being specifically lighter than the furfural, accumulates as the upper layer and it is removed through the side draw pipe 29 and flows through pipe 22 as the main portion of secondary solvent to be passed into the bottom of the secondary extractor 21. The small proportion of furfural which separates in the separator vessel 28 is withdrawn therefrom through the bottom draw pipe 30 and is added to the furfural passing from pipe 36 and this combined furfural then flows through pipe 37 and joins the main stream of furfural in pipe 24 and the furfural from these several sources then flows on through pipe 24 and pipe 13 to complete the furfural cycle. Any make-up furfural needed may be added to the system through pipe 13 and in like manner any make-up secondary solvent may be added to the system through a pipe 17.

The operation of the two fractionator towers 25 and 31 may be according to conventional methods to effect reasonably efficient fractionation of the stocks into their components.

I have found that the selectivity of the furfural for the cyclohexane is such that with the use of the cyclohexane reflux I can effect a very good separation between the paraffinic constituents and the naphthenic cyclohexane.

By use of a secondary solvent I am able to extract substantially all of the cyclohexane from the furfural and the furfural then does not need to be distilled. It is well known in the art that furfural polymerizes and becomes corrosive at high temperatures. The ratio of secondary solvent (normal octane) to the furfural passing through the secondary extractor is low, which operation then means that the relatively small volume of secondary solvent is distilled for recovery of the cyclohexane in comparison to the large volume of furfural which would have to be distilled in case the cyclohexane were removed from the furfural by distillation. In this manner, the energy required for the separation and recovery of cyclohexane is much less than if the furfural extract phase from the primary extractor were distilled.

The solubility relations of the hydrocarbons being separated with the furfural and with a secondary solvent are such that I am able to operate both extraction steps at atmospheric temperatures.

Table I is exemplary of the operation of this embodiment of my process when using furfural and normal octane as the two solvents for the separation of cyclohexane from close boiling isomeric heptanes, the extraction steps being at a temperature of 85° F.

Table I

[quantities in mols]

| Stream No. | 1 | 2 | 3 | 4 | 5 | 6 | 7 | 8 | 9 |
|---|---|---|---|---|---|---|---|---|---|
| Iso-heptanes | 15.0 | 0.31 | 14.59 | 3.14 | 2.42 | 3.73 | 0.90 | 0.31 | 3.71 |
| Cyclohexane | 85.0 | 1.18 | 0.90 | 242.94 | 157.66 | 243.02 | 1.25 | 1.17 | 241.81 |
| n-octane | | 77.20 | 77.29 | 0.71 | .80 | 144.50 | 220.52 | 76.73 | 1.23 |
| Furfural | | 2,163.64 | 4.64 | 2,159.00 | | 19.56 | 11.13 | 2,150.57 | |

| Stream No. | 10 | 11 | 12 | 13 | 14 | 15 | 16 | 17 | 18 |
|---|---|---|---|---|---|---|---|---|---|
| Iso-heptanes | 1.29 | 0.02 | 0.02 | 0.00 | 13.71 | 0.88 | 0.88 | 0.00 | 0.00 |
| Cyclohexane | 84.15 | 1.21 | 1.20 | 0.01 | 0.85 | 0.05 | 0.05 | 0.00 | 0.00 |
| n-octane | 0.43 | 143.27 | 142.83 | 0.44 | 0.15 | 77.14 | 77.11 | 0.03 | 0.58 |
| Furfural | | 19.56 | 7.20 | 12.36 | | 4.64 | 3.90 | 0.74 | |

Figure 2:
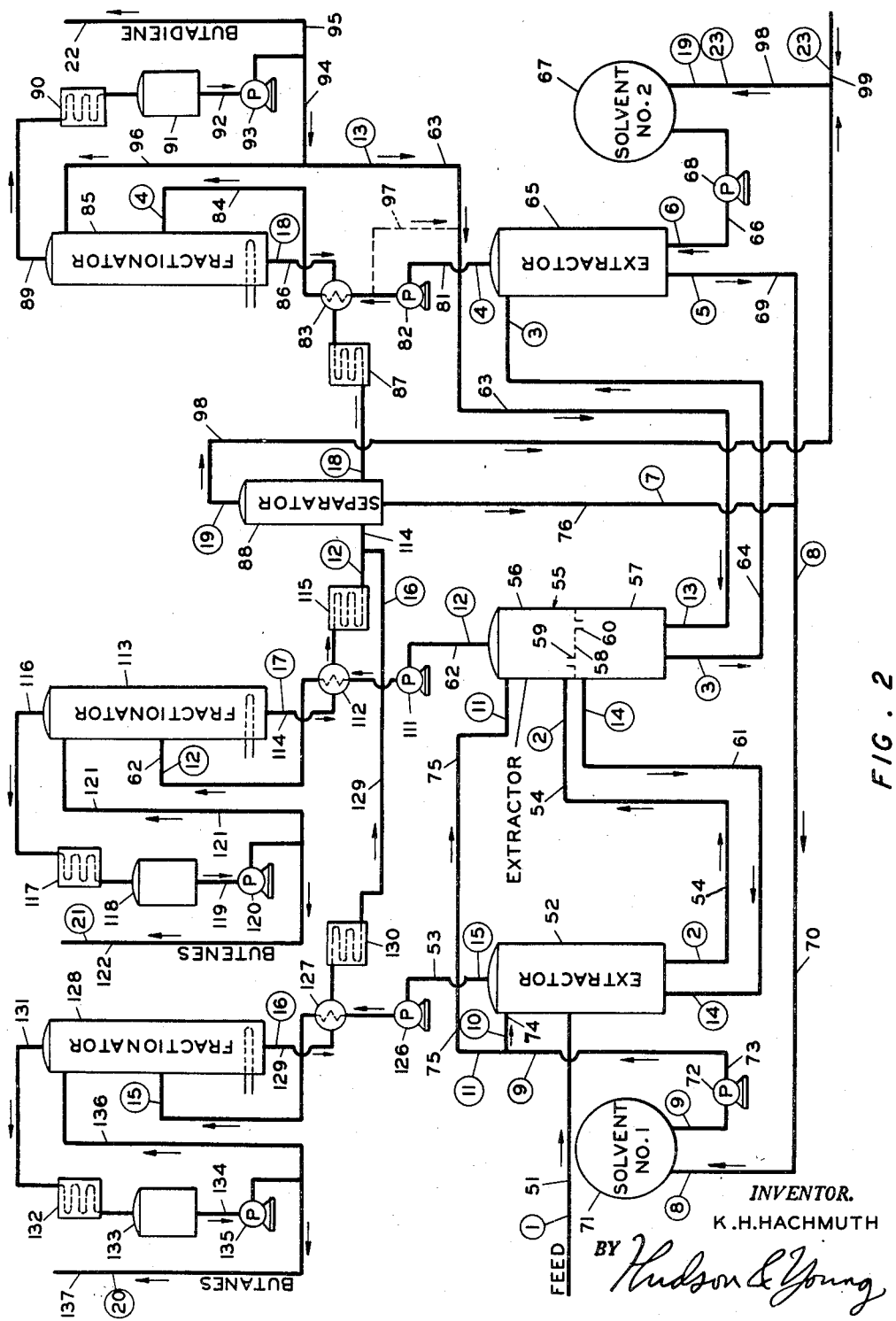
Figure 2 illustrates a method for the separation of a three component system into the three individual components by my extraction method.

Figure 2 represents an embodiment of my invention for separating three compounds of similar boiling points by a solvent extraction process. Vessels 52 and 65 are towers adapted for liquid-liquid contacting operations and may be of conventional design. Vessel 55 may, as illustrated in the drawing, be one vessel or may if desired be two vessels sitting side by side. The operation of the vessel is similar in either case since the diaphragm or separator element 58 divides the vessel into an upper half and a lower half. The downspout 60 is intended to conduct liquid materials from the upper half of this vessel to the lower section while a riser 59 is adapted to permit flow of materials from the bottom half to the upper half. The two halves of this vessel may be constructed in any manner desired to effect countercurrent liquid-liquid contact. Tank 71 is intended to serve as a storage or run tank for the primary solvent of the process. Tank 67 is a storage or run tank for the secondary solvent of the process. A pump 72 in line 73 is intended for transfer of a primary solvent material from the run storage tank 71 to the primary extractor vessel 52. A portion of the material from line 73 passes through the inlet line 74 to the vessel 52 and a portion is by-passed from this main extractor through a by-pass line 75 which in turn is connected with the upper portion of the vessel 55. Pipe 54 is intended to convey liquid material from the bottom of extractor 52 to the lower portion of section 56 of vessel 55 while line 61 connects the upper portion of section 57 with the bottom of the primary extractor 52. A line 64 connects the bottom of section 57 with the top of the secondary extractor 65. A line 69 connects the bottom of the secondary extractor 65 with pipe 70 which in turn is connected with the primary solvent storage tank 71. A pump 68 in line 66 is intended for transfer of liquid material from tank 67 to the bottom of the vessel 65. Pipe 99 is intended for use in adding make-up secondary solvent to the system. This make-up solvent flows from pipe 99 through pipe 98 into the storage tank 67. A pipe 53 carrying a pump 126 is adapted to conduct material from the top of the primary extractor 52 through a heat exchanger 127 to the mid-section of a fractionator vessel 128. Bottoms from this fractionator are withdrawn through a bottoms draw line 129 and pass through the exchanger 127, cooler 130, pipe 129 and pipe 114 into a settler tank 88. Overhead material from this fractionator 128 leaves by way of an overhead line 131 which in turn is connected with a condenser 132, condensate passing to an accumulator 133. Liquid from this accumulator passes through pipe 134 and pump 135, the outlet of the pump 135 being connected by way of line 136 to the top tray of the fractionator 128 and also to a product outlet line 137. A pipe 62 leads from the top of vessel 55 through a pump 111 and exchanger 112 to the mid-section of a fractionator vessel 113. A pipe 114 leads from the bottom of this fractionator through the heat exchanger 112 and cooler 115 to the settler tank 88. A pipe 116 leads from the top of the fractionator 113 through a condenser 117 to an accumulator vessel 118. A pipe 119 leads from the accumulator through a pump 120, the outlet of which is manifolded and connected by way of pipe 121 to the top of fractionator 113 and another outlet pipe 122. A pipe 81 connects the top of a secondary extractor 65 through a pump 82 and an exchanger 83 to pipe 84 which in turn leads to the middle section of a fractionator vessel 85. A pipe 86 leads from the bottom of this fractionator through the exchanger 83 and a cooler 87 to the settler 88. A pipe 98 connects the top portion of this settler 88 to the secondary solvent run tank 67. A pipe 76 connects the bottom of the settler 88 with pipe 70. A pipe 89 connects the top of the fractionator 85 by way of a condenser 90 to an accumulator or reflux run tank 91. The bottom of this tank is connected by line 92 to a pump 93. The outlet of the pump 93 is manifolded and line 92 is connected by way of pump 93 lines 94 and 96 to the top of the fractionator 85 above the top tray. Another connection from this manifold is the line 95. A pipe 63 is connected to the end of the line 94 and the bottom of section 57 of vessel 55. A pipe 97 connects pipe 81 at the point shown with the pipe 63.

I will describe the embodiment of my invention represented by Figure 2 for the separation of a stock containing the butanes, butenes and 1,3-butadiene. Such a stock may arise in the manufacture of butadiene from normal butane by the 2-stage catalytic dehydrogenation process as mentioned hereinbefore. A feed stock containing butanes, butenes and butadiene is conducted through a feed pipe 51 from a source not shown into the mid portion of the primary extractor vessel 52. I will describe the use of ethanolamine for exemplary purposes as a primary solvent. This ethanolamine from the solvent storage tank 71 may be pumped by pump 72 through pipe 73 and pipe 74 into the top of this extractor vessel. The ethanolamine then flows downward through this vessel and is finally removed therefrom by the outlet pipe 54. The feed stock from pipe 51 at its point of inlet contacts the ethanolamine and the unsaturated hydrocarbons of the feed stock are preferentially absorbed by the ethanolamine and this mixture leaves the extractor by the outlet line 54 as the extract phase. The butanes, which are fully saturated, are substantially insoluble in the ethanolamine and they rise upward through the ethanolamine as droplets of liquid and accumulate above the surface of the ethanolamine as the raffinate phase. The raffinate then leaves the extractor 52 by way of the overhead pipe 53 under influence of the pump 126 and passes through the heat exchanger 127 and enters the mid section of the fractionator 128. This fractionator 128 is intended to remove the butanes from secondary and small amounts of primary solvent carried in solution in the raffinate phase. The butanes so separated leave the top of the fractionator through the overhead vapor pipe 131 and are condensed in condenser 132 and accumulate in vessel 133. The condensate from vessel 133 then passes through pipe 134 under influence of pump 135 and a portion is passed through the pipe 136 and added to the fractionator 128 at a point above the top tray as reflux for the tower. The remaining portion of this reflux condensate may be removed by way of line 137 as a product of the process for such disposal as desired. The bottoms material from the fractionator 128 is withdrawn by way of line 129, is cooled by exchanger 127 and further cooled by cooler 130, and is passed through pipe 114 into settler tank 88.

A portion of the primary solvent ethanolamine is by-passed from inlet pipe 74 through pipe 75 and is added to the top of section 56 of the vessel 55. The extract phase from the primary extractor 52, as mentioned, leaves this vessel by way of pipe 54 and is added to the bottom of section 56 of the vessel 55. Some of the material which accumulates under the diaphragm 58 in vessel 55 is withdrawn through pipe 61 and is passed into the bottom of the primary extractor. This material, as will be explained hereinafter, is intended to serve as a reflux for the bottom portion of the primary extractor.

The raffinate phase material passing through line 53 contains the normal butanes while the extract phase leaving through pipe 54 contains the butenes and butadiene.

In the vessel 55 a separation is made between the butenes and the butadiene from this primary extract phase. The material leaving vessel 55 through pipe 64 is composed largely of primary solvent, that is ethanolamine, and butadiene. Liquid butadiene is transferred through pipe 63 from a subsequent step in this operation and is added to the bottom of section 57 of vessel 55 to reflux this portion of the vessel. This butadiene in refluxing this portion of the vessel helps to strip out any of the butenes carried downward in the ethanolamine in vessel 55. Material accumulating just under the diaphragm 58 as a separate liquid phase consists largely of the butenes with only a minor portion of butadiene. It is some of this material which is passed through pipe 61 and added to the bottom of the primary extractor vessel 52 as refluxing material. The remaining portion of the liquid phase accumulating under diaphragm 58 passes upward through the riser 59 and then works its way upward through the upper section 56 of vessel 55. In passing through this section 56 the newly added ethanolamine from pipe 75 is intended to remove any remaining butadiene from the rising butenes so that nearly pure butenes can be withdrawn as a raffinate phase from the top of vessel 55. Such a raffinate phase is withdrawn from the top of this vessel through a pipe 62 and is transferred by the pump 111 through the heat exchanger 112 and is heated therein and then passed on through the pipe 62 to be introduced into the fractionator vessel 113. In this vessel the butenes are fractionated away from any solvent materials which are higher boiling than the butenes. Accordingly, the butenes are removed from this fractionator as vapor through the overhead pipe 116 and are condensed in condenser 117, the condensate passing into the accumulator 118. From this accumulator the condensate is removed through pipe 119 by pump 120 and a part of the condensate is returned by way of the reflux line 121 to the top tray of the tower as reflux and the remainder passes through pipe 122 to storage or such other disposal as desired. The bottoms material from the fractionator 113 is removed through line 114, is cooled in exchanger 112 and is further cooled in cooler 115 and is finally transferred on through pipe 114 into the settler 88.

The bottoms material withdrawn from the bottom section 57 of vessel 55 consists mainly of ethanolamine and butadiene and this mixture is passed through pipe 64 and introduced into the top portion of the secondary extractor 65. A secondary solvent, which for exemplary purposes may be pentane, is passed from the secondary solvent run tank 67 through pipe 66 and introduced into the bottom of the secondary extractor 65. This pentane being specifically lighter than the ethanolamine-butadiene stock tends to rise upward through the extractor while the ethanolamine containing material flows downward. Thus, a countercurrent extractive operation is effected in this vessel and the butadiene from the primary solvent is transferred to the pentane or secondary solvent. This latter material, that is butadiene and pentane, is herein termed the secondary extract phase and this material is withdrawn from the secondary extractor through pipe 81 and it is pumped by the pump 82 through the exchanger 83 in which the material is heated. This heated stock is then pumped on through pipe 84 and introduced into the fractionator 85 at about a mid point. In this fractionator it is intended to separate by distillation the butadiene from the secondary solvent and from any primary solvent that may have passed into solution in the secondary solvent. The butadiene then, as vapor, passes overhead from fractionator 85 through pipe 89, is condensed in condenser 90 and condensate is passed into the accumulator 91. From this accumulator condensate is pumped through pipe 92 by pump 93, a portion of the condensate being passed through the pipes 94 and 96 and introduced into the top of the fractionator 85 as reflux. The remainder of the condensate from the pump 93 passes through pipe 95 as the third and main product of the process to storage or such disposal as desired. A portion of this butadiene concentrate passing through pipe 94 is by-passed from the reflux pipe 96 and conducted through the pipe 63 and added to the bottom of the lower section 57 of the vessel 55. This butadiene rich stock as mentioned hereinbefore serves as refluxing agent in this section 57 of the vessel 55. Bottoms material from the fractionator 85, which consists largely of the secondary solvent, is withdrawn through pipe 86, is cooled in exchanger 83 and further cooled in cooler 87 and is finally transferred to the settler 88.

The liquid material in settler 88 originated from bottoms material from fractionators 85, 113 and 128, and since the bottoms from all three of these fractionators contain at least some primary solvent and some secondary solvent, this settler serves as a solvent accumulator. Since the primary and secondary solvents are only very slightly soluble in one another the large portion of the ethanolamine separates out as a lower liquid phase and the main portion of the pentane or secondary solvent separates as the upper phase. The lower liquid phase or ethanolamine is withdrawn from this settler 88 through pipe 76 and is transferred to the main stream of ethanolamine in transit from the bottom of extractor 65 through the lines 69 and 70. The secondary solvent from the top of the settler 88 is withdrawn through pipe 98 and transferred therethrough to the secondary solvent storage tank 67.

Each of the three fractionators may be operated under such temperature and pressure conditions as to effect the desired separations.

I have found that by operating in the manner according to the flow diagram of Figure 2 and with the intermediate extractor vessel 55 that all extraction steps may be carried out at atmospheric temperatures. By operating under said temperature conditions at least in the extractors, considerable energy in the form of heat is saved since most conventional extraction operations for the separation of such materials is carried out either above atmospheric temperature or below atmospheric temperature or may be a combination of the two temperature conditions.

A line 97 is shown in Figure 2 connecting line 81 on the discharge side of the pump 82 and line 63. This line 97 is used to provide an amount or concentration of secondary solvent in the bottom of section 57 of vessel 55 such that two liquid phases will be maintained even though the butadiene is soluble in all proportions in the primary solvent under the conditions of operation. The secondary solvent must be not soluble in all proportions in the primary solvent in all cases to make this process operable. The use of the by-pass 97 is not essential to the process, but when desired to be used serves the above-mentioned purpose.

Table II gives the compositions of the feed stock, of the final extraction products and the compositions at many intermediate points in the system. These compositions are given in terms of pound moles.

Table II

| Stream No. | 1 | 2 | 3 | 4 | 5 | 6 | 7 | 8 |
|---|---|---|---|---|---|---|---|---|
| Butanes | 70.0 | 3.5 | | 0.2 | | 0.2 | | |
| Butenes | 27.0 | 189.1 | 19.8 | 19.8 | | | | |
| Butadiene | 3.0 | 21.6 | 596.5 | 596.7 | 0.9 | 1.1 | | 0.1 |
| Solvent No. 2 | | | 0.8 | 0.7 | 440.7 | 81.5 | 521.5 | 0.1 | 81.6 |
| Solvent No. 1 | | 8803.2 | 10173.1 | 15.1 | 10163.3 | 5.3 | 11.7 | 10175.0 |

| Stream No. | 9 | 10 | 11 | 12 | 13 | 14 | 15 | 16 |
|---|---|---|---|---|---|---|---|---|
| Butanes | | | | 0.5 | 0.2 | 3.2 | 69.7 | 0.2 |
| Butenes | | | | 26.7 | 19.7 | 162.3 | 0.2 | |
| Butadiene | 0.1 | 0.8 | 0.1 | 0.3 | 593.3 | 18.2 | 0.4 | |
| Solvent No. 2 | 81.6 | 70.6 | 11.0 | 11.9 | 1.5 | 0.7 | 70.5 | 70.3 |
| Solvent No. 1 | 10175.0 | 8800.0 | 1375.0 | 0.5 | | 4.6 | 1.4 | 1.4 |

| Stream No. | 17 | 18 | 19 | 20 | 21 | 22 | 23 |
|---|---|---|---|---|---|---|---|
| Butanes | | | 0.2 | 69.5 | 0.5 | | |
| Butenes | | | | 0.2 | 26.7 | 0.1 | |
| Butadiene | | 1.1 | 1.1 | 0.4 | 0.3 | 2.3 | |
| Solvent No. 2 | 11.8 | 439.2 | 521.2 | 0.2 | 0.1 | | 0.3 |
| Solvent No. 1 | 0.5 | 15.1 | 5.3 | | | | |

Solvent No. 1 = Ethanolamine.
Solvent No. 2 = pentane or hexane.

Table III gives the composition of the extraction products and at many intermediate points of the system when β-hydroxypropionitrile is used as a primary solvent and pentane or hexane is used as a secondary solvent.

Table III

| Stream No | 1 | 2 | 3 | 4 | 5 | 6 | 7 | 8 |
|---|---|---|---|---|---|---|---|---|
| Butanes | 70.0 | 4.2 | | 0.2 | | 0.2 | | |
| Butenes | 27.0 | 222.6 | 26.4 | 26.4 | | | | |
| Butadiene | 3.0 | 25.1 | 779.2 | 779.6 | 1.4 | 1.6 | | 1.4 |
| Solvent No. 2 | | 1.1 | 1.1 | 660.0 | 89.8 | 748.7 | 0.2 | 90.0 |
| Solvent No. 1 | | 7155.2 | 7696.6 | 29.3 | 7678.0 | 10.7 | 22.0 | 7700.0 |

| Stream No | 9 | 10 | 11 | 12 | 13 | 14 | 15 | 16 |
|---|---|---|---|---|---|---|---|---|
| Butanes | | | | 0.5 | 0.2 | 3.9 | 69.7 | 0.2 |
| Butenes | | | | 26.7 | 26.3 | 195.8 | 0.2 | |
| Butadiene | 1.4 | 1.3 | 0.1 | 0.4 | 775.6 | 21.2 | 0.4 | |
| Solvent No. 2 | 90.0 | 82.1 | 7.9 | 8.9 | 2.0 | 1.0 | 82.0 | 81.8 |
| Solvent No. 1 | 7700.0 | 7150.0 | 550.0 | 1.2 | | 7.4 | 2.2 | 2.2 |

| Stream No | 17 | 18 | 19 | 20 | 21 | 22 | 23 |
|---|---|---|---|---|---|---|---|
| Butanes | | | | 0.2 | 69.5 | 0.5 | |
| Butenes | | | | | 0.2 | 26.7 | 0.1 |
| Butadiene | | | 1.6 | 1.6 | 0.4 | 0.4 | 2.2 |
| Solvent No. 2 | | 8.8 | 658.0 | 748.4 | 0.2 | 0.1 | 0.3 |
| Solvent No. 1 | | 1.2 | 29.3 | 10.7 | | | |

Solvent No. 1—β-hydroxypropionitrile.

Table IV gives the compositions of the extraction products and the compositions at many intermediate points when ethylene glycol is used as a primary solvent and pentane or hexane is used as a secondary solvent.

Table IV

| Stream No | 1 | 2 | 3 | 4 | 5 | 6 | 7 | 8 |
|---|---|---|---|---|---|---|---|---|
| Butanes | 70.0 | 4.1 | | 0.3 | | 0.3 | | |
| Butenes | 27.0 | 219.9 | 20.2 | 20.2 | | | | |
| Butadiene | 3.0 | 24.6 | 613.7 | 613.7 | 1.4 | 1.4 | | 1.4 |
| Solvent No. 2 | | 1.1 | 0.8 | 550.0 | 115.7 | 664.9 | 0.1 | 115.8 |
| Solvent No. 1 | | 19800.6 | 21997.1 | 23.6 | 21977.6 | 4.1 | 22.4 | 22000.0 |

| Stream No | 9 | 10 | 11 | 12 | 13 | 14 | 15 | 16 |
|---|---|---|---|---|---|---|---|---|
| Butanes | | | | 0.5 | 0.3 | 3.9 | 69.8 | 0.3 |
| Butenes | | | | 26.7 | 20.1 | 193.1 | 0.2 | |
| Butadiene | 1.4 | 1.3 | 0.1 | 0.4 | 610.1 | 20.7 | 0.4 | |
| Solvent No. 2 | 115.8 | 104.2 | 11.6 | 12.5 | 1.6 | 1.0 | 104.1 | 103.9 |
| Solvent No. 1 | 22000.0 | 19800.0 | 2200.0 | 0.4 | | 3.1 | 2.5 | 2.5 |

| Stream No | 17 | 18 | 19 | 20 | 21 | 22 | 23 |
|---|---|---|---|---|---|---|---|
| Butanes | | | | 0.3 | 69.5 | 0.5 | |
| Butenes | | | | | 0.2 | 26.7 | 0.1 |
| Butadiene | | | 1.4 | 1.4 | 0.4 | 0.4 | 2.2 |
| Solvent No. 2 | | 12.4 | 548.4 | 664.6 | 0.2 | 0.1 | 0.3 |
| Solvent No. 1 | | 0.4 | 23.6 | 4.1 | | | |

Solvent No. 1—Ethylene glycol.

In the system as shown in Figure 2, the primary extractor vessel 52 may contain from 20 to 25 equilibrium steps. The secondary extractor vessel may contain from 18 to 20 equilibrium steps and the intermediate vessel 55 may contain from 18 to 22 steps, which are divided between the sections 56 and 57 as found desirable according to the separation to be made.

Most auxiliary apparatus such as pumps, valves, regulators, controllers and the like are not shown nor discussed, for purposes of simplicity. The function of such apparatus parts is well known to those skilled in the art.

The apparatus for use in the process of my invention need not be special as far as my invention is concerned, since no excessive temperatures, pressure or other conditions are used.

The process of my invention may be applied to the separation of 2 or 3 component systems, as herein explained, or the principles thereof may be applied in systems wherein 4 or even more components of similar volatility properties are to be separated merely by using more than two solvents and accordingly a greater number of extraction vessels, fractionators, etc.

In this specification and in the appended claims, hydrocarbons of the several classes of hydrocarbons, viz., paraffins, cycloparaffins, olefins, diolefins, and aromatics, are considered as being separable from one another depending on their relative solubilities in the primary solvent. The relative separability of these hydrocarbons will vary depending upon the particular solvent selected for use. The solubility of a hydrocarbon in a solvent may usually be taken as an indication of the selectivity of the solvent for that hydrocarbon.

The process of my invention may be used for separating other compounds than hydrocarbons, for example, oxygenated Fischer-Tropsch synthesis products. Glycols may be separated from alcohols, alcohols from ethers, sulfur compounds from hydrocarbons, etc. It may also be used for separating oxygenated compounds from hydrocarbons.

There may be many variations or alterations in the practicing of my invention, as will be understood by those skilled in the art, without departing from the intended spirit and scope of the invention. I wish to be limited only by the following claims.

I claim:

1. A process for separating a mixture of liquefied butanes, butenes and butadiene according to their degree of unsaturation comprising introducing said mixture into a first extraction zone at an intermediate point, introducing a quantity of a first solvent having a preferential selectivity for unsaturated hydrocarbons into said zone at a point near one end, countercurrently contacting said mixture of hydrocabrons and said first solvent under conditions to form a first raffinate phase and a first extract phase, removing the first raffinate phase from said one end of said first zone, recovering butanes from said first raffinate phase as a first product of the process and removing said first extract phase from the opposite end of said first zone; introducing this extract phase into one end of a first intermediate zone, introducing an intermediate product rich in butenes and as subsequently produced into said one end of said first intermediate zone, introducing a second quantity of said first solvent into said first intermediate zone at the other end and countercurrently contacting said extract phase and said intermediate product rich in butenes with said second quantity of said first solvent, removing a butene containing intermediate raffinate free from butadiene from said other end of said first intermediate zone and recovering the butenes therefrom as a second product of the process and removing an intermediate extract phase from said one end of said first intermediate zone; introducing this intermediate extract phase into one end of a second intermediate zone, removing some intermediate product rich in butenes from said one end of said second intermediate zone and introducing same into said opposite end of said first extraction zone as reflux and removing the remainder of said intermediate product rich in butenes from said one end of said second intermediate zone and introducing same into said one end of said first intermediate zone as said intermediate product rich in butenes and as subsequently produced, introducing a portion of a butadiene product as subsequently produced into the other end of said second intermediate zone and countercurrently contacting this butadiene product with said intermediate extract phase in said second intermediate zone and removing therefrom an extract phase rich in butadiene; introducing this latter extract phase rich in butadiene into one end of a second extraction zone, introducing a secondary solvent in which butadiene is soluble into the other end of said second extraction zone and countercurrently contacting said extract phase rich in butadiene and said secondary solvent, removing a raffinate phase from said other end of said second extraction zone comprising first solvent and recycling this raffinate as primary solvent to the first extraction zone and to the first intermediate zone, removing an extract phase rich in butadiene from said one end of said second extraction zone, recovering said butadiene from secondary solvent of last said extract phase, recycling said secondary solvent to said secondary extraction zone, introducing a portion of said recovered butadiene into said other end of said second intermediate zone as said butadiene product subsequently produced and removing the remaining portion of said recovered butadiene as a third product of the process.

2. The process of claim 1 wherein said first and second extraction zones and the intermediate contacting zones are operated at atmospheric temperature.

3. The process of claim 1 wherein a portion of the extract phase rich in butadiene from said second extraction zone is introduced into said other end of said second intermediate zone in lieu of a portion of said butadiene product subsequently produced, and removing the entire recovered butadiene as said third product of the process.

4. The process of claim 1 wherein the primary solvent is ethanolamine and the secondary solvent is pentane.

5. The process of claim 1 wherein the primary solvent is β-hydroxy-propionitrile and the secondary solvent is pentane.

6. The process of claim 1 wherein the primary solvent is ethylene glycol and the secondary solvent is pentane.

7. The process of claim 1 wherein the primary solvent is furfural.

KARL H. HACHMUTH.

REFERENCES CITED

The following references are of record in the file of this patent:

UNITED STATES PATENTS

| Number | Name | Date |
| --- | --- | --- |
| 1,878,022 | Stratford | Sept. 20, 1932 |
| 2,002,702 | Merrill et al. | May 28, 1935 |
| 2,210,541 | Tijmstra | Aug. 6, 1940 |
| 2,371,817 | Frey | Mar. 20, 1945 |
| 2,396,300 | Cummings et al. | Mar. 12, 1946 |
| 2,410,496 | Graff | Nov. 5, 1946 |

FOREIGN PATENTS

| Number | Country | Date |
| --- | --- | --- |
| 532,821 | Great Britain | Jan. 31, 1941 |